United States Patent
Gonzalez et al.

(10) Patent No.: US 11,040,895 B2
(45) Date of Patent: Jun. 22, 2021

(54) PASSIVE GREASE TRAP WITH DOUBLE BAFFLE

(71) Applicant: Thermaco, Incorporated, Asheboro, NC (US)

(72) Inventors: Francisco Javier Gonzalez, Randleman, NC (US); Zachary Michael Rubeor, Greensboro, NC (US); William Charles Batten, Asheboro, NC (US); Bruce W. Kyles, Asheboro, NC (US)

(73) Assignee: Thermaco, Incorporated, Asheboro, NC (US)

( * ) Notice: Subject to any disclaimer, the term of this patent is extended or adjusted under 35 U.S.C. 154(b) by 0 days.

(21) Appl. No.: 16/594,907

(22) Filed: Oct. 7, 2019

(65) Prior Publication Data

US 2020/0109067 A1 Apr. 9, 2020

Related U.S. Application Data

(60) Provisional application No. 62/742,557, filed on Oct. 8, 2018.

(51) Int. Cl.
*C02F 1/40* (2006.01)
*B01D 17/02* (2006.01)

(52) U.S. Cl.
CPC ............ *C02F 1/40* (2013.01); *B01D 17/0211* (2013.01)

(58) Field of Classification Search
CPC ... C02F 1/40; C02F 2103/002; B01D 17/0211
USPC ........................................................ 210/703
See application file for complete search history.

(56) References Cited

U.S. PATENT DOCUMENTS

| | | | |
|---|---|---|---|
| 3,175,373 A | 3/1965 | Holkeboer et al. ............. | 62/268 |
| 3,731,802 A * | 5/1973 | James ................ | B01D 17/0211 |
| | | | 210/774 |
| 4,111,805 A * | 9/1978 | Van Pool ........... | B01D 17/0208 |
| | | | 210/522 |
| 6,238,572 B1 | 5/2001 | Batten ........................... | 210/739 |
| 6,413,435 B1 * | 7/2002 | Kyles ................ | B01D 21/0042 |
| | | | 210/800 |

(Continued)

FOREIGN PATENT DOCUMENTS

| | | | |
|---|---|---|---|
| CN | 201325894 Y | 10/2009 | |
| WO | WO2017035220 A1 | 3/2017 | ................ C02F 1/40 |

OTHER PUBLICATIONS

ISRd Written Opinion for PCT/US19/54390.

*Primary Examiner* — Nam X Nguyen
*Assistant Examiner* — Ekandra S. Miller-Cruz
(74) *Attorney, Agent, or Firm* — MacCord Mason PLLC

(57) ABSTRACT

A grease trap for separating waste from waste water that includes grey water and FOG includes a tank having a bottom and an interior volume. An inlet invert in the tank has a discharge end for discharging waste water into the tank, and an outlet invert in the tank has a drain end for removing grey water from the tank. A first baffle across the interior volume below the discharge of the inlet invert and above the drain end of the outlet invert has a hole allowing grey water to descend through the hole to a path under the first baffle to the drain end of the outlet invert. A second baffle across the interior volume above the discharge of the inlet invert has a hole allowing FOG to float through the hole in the second baffle to collect above the second baffle.

17 Claims, 15 Drawing Sheets

(56) References Cited

U.S. PATENT DOCUMENTS

| | | | |
|---|---|---|---|
| 7,367,459 B2 * | 5/2008 | Batten | B01D 17/0214 |
| | | | 210/521 |
| 7,641,805 B2 | 1/2010 | Batten | 210/801 |
| 7,828,960 B1 | 11/2010 | Batten | 210/86 |
| 8,252,188 B1 | 8/2012 | Batten | 210/742 |
| 9,528,258 B1 | 12/2016 | McBride | E03F 5/16 |
| 9,932,247 B1 * | 4/2018 | Batten | B01D 17/0211 |
| 2001/0025811 A1 * | 10/2001 | Batten | B01D 17/0208 |
| | | | 210/143 |
| 2002/0170864 A1 * | 11/2002 | Batten | B01D 21/2433 |
| | | | 210/803 |
| 2007/0012608 A1 | 1/2007 | Su | 210/170.03 |
| 2008/0203037 A1 | 8/2008 | Batten | 210/803 |
| 2013/0221545 A1 | 8/2013 | Bird | 261/3 |

* cited by examiner

PASSIVE GREASE TRAP WITH DOUBLE BAFFLE

BACKGROUND

Historically, grease traps have been used in restaurants and other commercial facilities to limit the amount of grease and solid waste that is carried into sewer systems via waste water. Typical grease traps are either passive grease traps or automatic grease traps. Passive grease traps are usually only emptied of the waste periodically and therefore waste tends to build up inside the tank. Passive grease traps typically include a tank with an inlet that brings in waste water and an outlet that carries water out of the system. Lightweight grease rises to the top of the tank and heavier solids settle in the bottom of the tank. A problem with many grease traps is that water may flush through the system with such velocity that it disrupts the grease that has already separated, causing the waste to be expelled with grey water. This is especially true as the tank fills up with grease, so that the grease/water interface is closer to the grease trap bottom.

Substantial advances have been made in the last dozen years, as exemplified by the Trapzilla line of grease traps sold by Thermaco, Inc. of Asheboro, N.C. Information about Trapzilla grease traps is available at http://thermaco.com/ trapzilla and Trapzilla technology is disclosed in U.S. Pat. No. 7,367,459 to Batten et al.; U.S. Pat. No. 7,641,805 to Batten et al.; U.S. Pat. No. 9,528,258 to McBride et al.; U.S. Pat. No. 9,932,247 to Batten et al. The disclosures of these references are hereby incorporated herein by reference.

While achieving substantial commercial success and industry recognition, those devices still permit small quantities of FOG to go downstream with the grey water, so there is room for improvement. In some examples, the improvement disclosed herein may be added to structures disclosed in the patents disclosed above, and this disclosure should be deemed, in some examples, to cover combinations of those structures with any structures disclosed herein.

SUMMARY

The inventions of the present disclosure fulfill one or more of these needs in the art by providing a grease trap for separating waste from waste water that includes grey water and FOG including a tank having a bottom and an interior volume. In one embodiment, an inlet invert in the tank has a discharge end for discharging waste water into the tank and an outlet invert in the tank having a drain end for removing grey water from the tank. A first baffle across the interior volume below the discharge of the inlet invert and above the drain end of the outlet invert has a hole allowing grey water to descend through the hole to a path under the first baffle to the drain end of the outlet invert. A second baffle across the interior volume above the discharge of the inlet invert has a hole allowing FOG to float through the hole in the second baffle to collect above the second baffle. The tank may be roto-molded plastic and may be provided with a lid covering the tank.

The first and second baffles may diverge so waste water entering the tank between the baffles encounters an enlarging volume. The first baffle may be conical with a downward apex and the second baffle may also be conical, with an upward apex. The hole in the first baffle is preferably at a downward apex and the hole in the second baffle is preferably an upward apex. The first and second baffles may each substantially span the interior volume of the tank. The baffles may be connected to one another by a joining peripheral wall sized and shaped to nest in the tank. The peripheral wall preferably has an indentation for the inlet invert and an indentation for the outlet invert.

The first baffle may include a vertical baffle extending downward and positioned to shield the drain end of the outlet invert. Similarly, the second baffle may include a vertical baffle extending downward and positioned to shield the discharge end of the inlet invert.

The invention may also be considered as a grease trap for separating waste from waste water including an outer tank having a bottom, an inlet invert having a discharge end for directing waste water into the tank and an outlet invert for directing water from the tank. An inner pair of horizontal baffles, one baffle being above the discharge end and the other baffle being below the discharge end, and both baffles having a hole therein so the baffles divide the outer tank into upper, middle and lower chambers. FOG and solids may separate from the waste water within the middle chamber such that grey water and heavy solids fall through the hole in a lower one of the baffles to the lower chamber and FOG rises to enter the upper chamber through the hole in the upper one of the baffles and is sequestered by both baffles from currents flowing at the outlet invert, thereby inhibiting later mixing of sequestered FOG into the grey water exiting the grease trap.

The invention may also be considered as a method of separating FOG from grey water including discharging effluent having FOG and grey water into a tank between an upper and a lower baffle, allowing the grey water to descend in the tank through a hole in the lower baffle and exit the tank along an upward path to an exit above the upper baffle, and allowing the FOG to float through a hole in the upper baffle where the FOG is protected from entrainment in flows of grey water exiting the tank. Discharging effluent having FOG and grey water into a tank between an upper and a lower baffle may include baffling the path of the effluent as it enters the tank before the effluent encounters the upper and lower baffles so the effluent progresses toward the lower baffle while leaving a path for FOG to float to the upper baffle. Allowing the grey water to exit the tank may include baffling the path of the grey water after it descends through the hole in the lower baffle to lengthen the path the grey water traverses to exit the tank. Discharging effluent having FOG and grey water into a tank may include discharging solids in the effluent so the solids traverse with the grey water as the grey water descends in the tank through the hole in the lower baffle.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
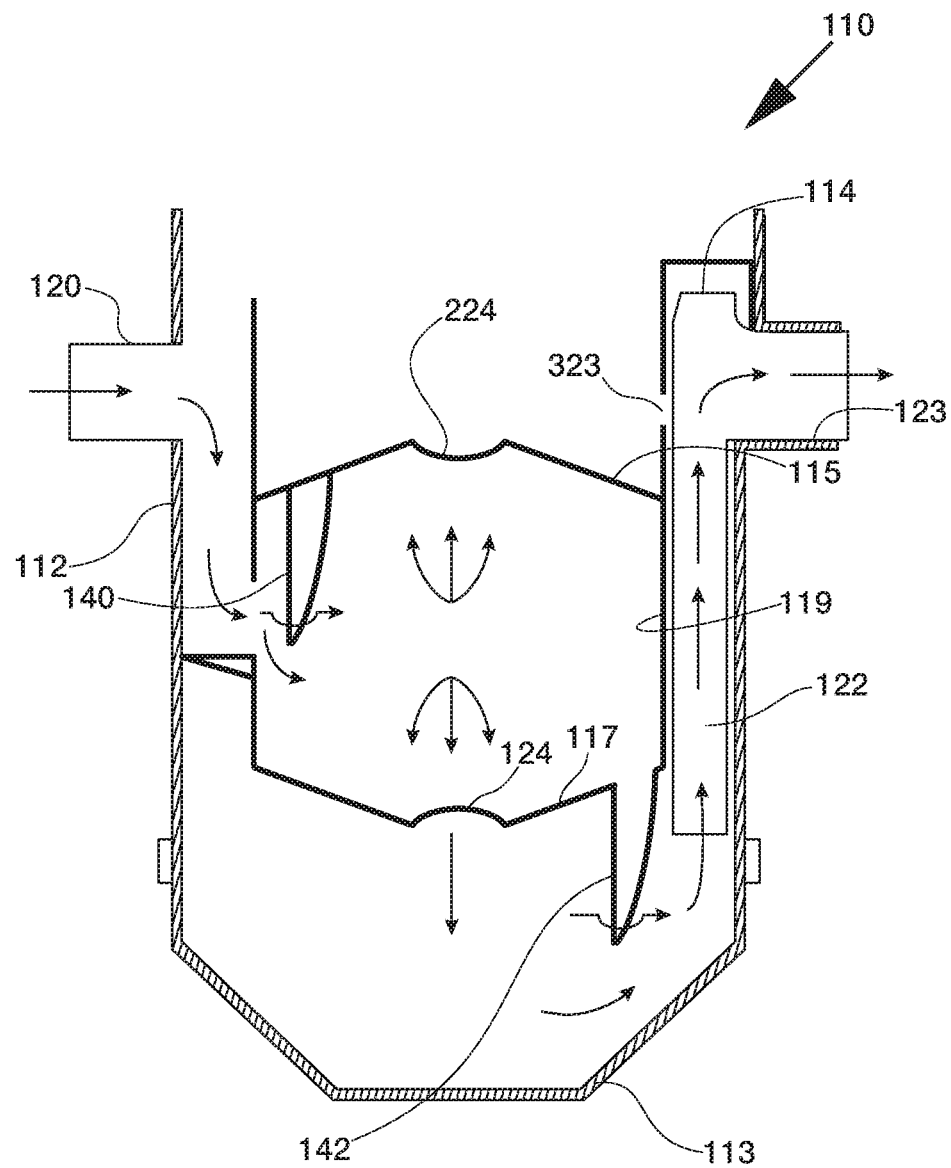
FIG. 1 is a schematic sectional view of an improved grease trap according to an embodiment of the invention.

The improved grease trap disclosed herein may be considered an improvement of the grease trap disclosed in U.S. Pat. No. 7,367,459, which has enjoyed considerable commercial success, sold as the Trapzilla line of grease traps by Thermaco, Inc. of Asheboro, N.C. Before discussing specifically some examples of the improved grease trap, an example of which is shown in FIG. 1, the following discussion with reference to some aspects of FIGS. 2-4 of portions of the structure and operation of the grease traps generally should be helpful to those of ordinary skill in understanding the improvement, its operations and differences.

Figure 2:
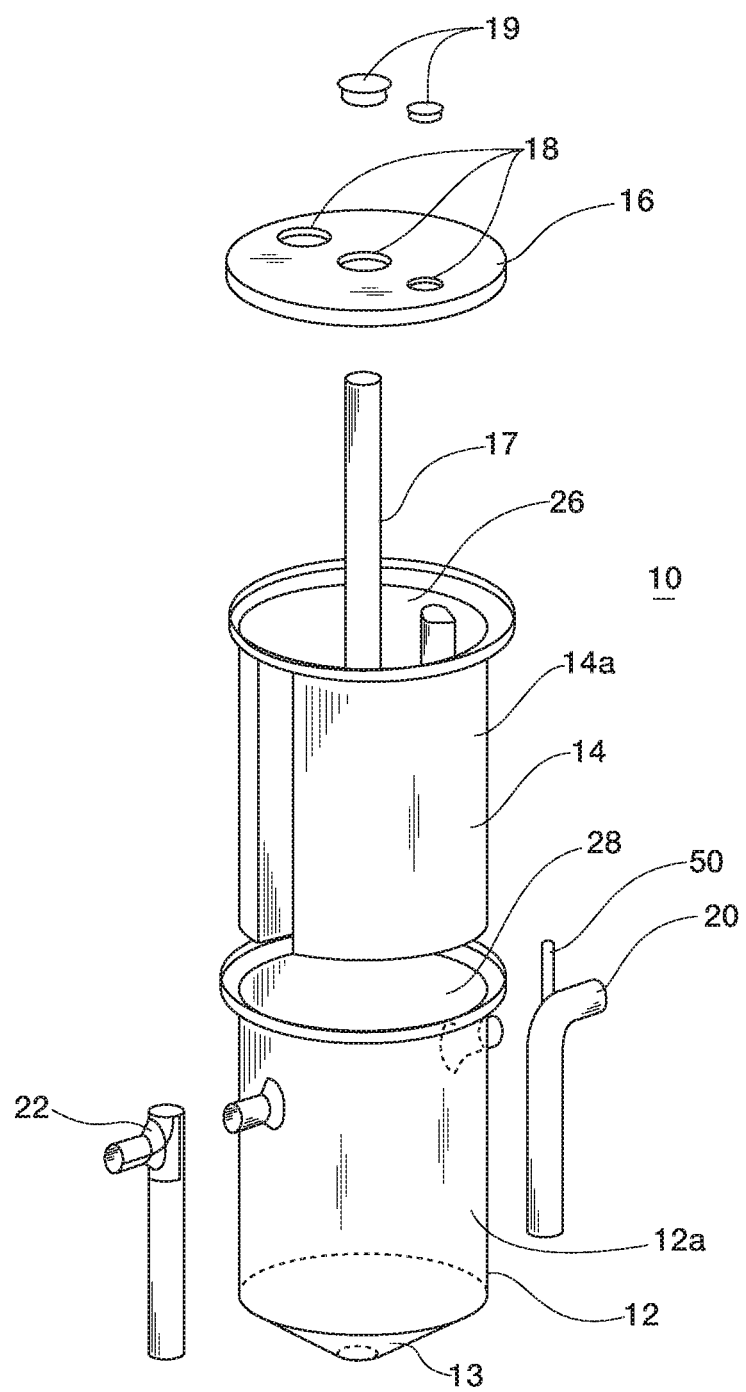
FIG. 2 is an exploded view of one example of a grease trap.

FIG. 2 shows a FOG trap 10 for separating solids and FOG from waste water. The FOG trap 10 includes an outer tank 12 with a bottom 13 that is conical with its apex downward, as seen in FIG. 2. The bottom may be shaped like an inverted pyramid, bowl shape, slanted plane, or the like, can be used. Preferably, the lowermost portion of the bottom is centrally located, but that is not critical. As seen in FIG. 2, an inlet invert 20 is provided for connecting to a waste water source, such as a kitchen sink drain, allowing waste water to flow into the outer tank 12. The FOG trap also 10 includes a tank lid 16. The tank lid 16 includes an outlet port 18 provided with a removable closure 19. The outlet port 18 allows for the connection of a pipe through which solids and FOG may be sucked out of the grease trap 10. Other outlet ports may be provided to vent gases, selectively remove heavy solids from the 13, or selectively remove FOG trapped in the upper chamber 26, as seen in FIG. 4.

FIG. 2 shows an exploded view. The grease trap 10 includes an outer tank 12 with a bottom 13. An inner tank 14 is inserted into the outer tank 12 such that there is very little space, if any, between the walls 14a of the inner tank 14 and the walls 12a of the outer tank 12. Other shapes for the perimeter of the trap such as pentagonal, trapezoidal, triangular, or even free form could be used.

Figure 4:
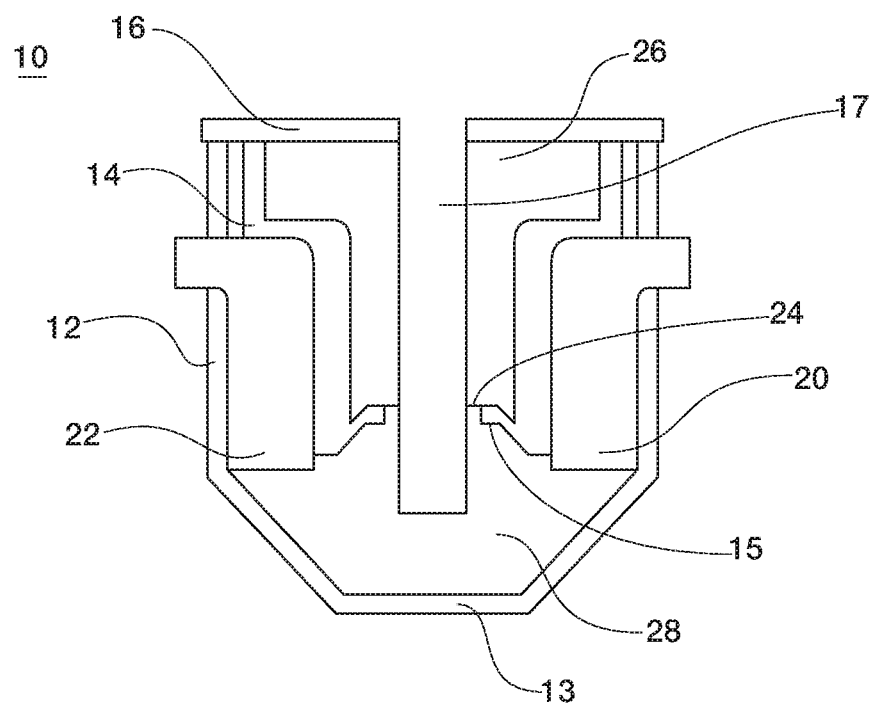
FIG. 4 is a cross-sectional view of one example of the grease trap of FIG. 2.

The inner tank 14 has a bottom 15, as best seen in FIG. 4 when in the shape of an inverted pyramid, so that the bottom 15 of the inner tank 14 and the bottom 13 of the outer tank 12 diverge. The bottom 15 divides the outer tank 12 into an upper chamber 26 where lightweight FOG collects, and a lower chamber 28 where heavy solids may settle.

As effluent made up of water, solids, and FOG flows into the tank through the inlet invert 20, its velocity slows as the separation between the bottom 15 and the bottom 13 increases, where the cross-sectional area that the effluent current encounters increases. This concept of increasing residence time and enabling greater separation by a greater cross-section is disclosed in U.S. Pat. No. 6,238,572 to Batten, the entire disclosure of which is hereby incorporated by reference. The slower the effluent, the greater the probability that the lightweight FOG can separate from the water. The separated FOG rises to the apex of the bottom 15 and through the central hole 24 in the bottom 15. After passing the position of greatest divergence, the effluent (generally depleted of its FOG) can increase in speed as it makes its way from the center to the outlet invert 22.

Preferably, and in some embodiments, the inner tank 14 and the outer tank 12 are roto-molded plastic. In some cases, the inlet invert, outlet invert, and outer tank are can be molded as one piece. However, the grease trap 10 may be made of metal, and the parts may be welded together or joined by other fasteners.

As seen in FIG. 2, in a cylindrical embodiment, the inlet invert may include a vent 50 for venting gases from the grease trap 10 and acts as an anti-siphon. The vent 50 may be hooked up to an external ventilation system to prevent odors from escaping the grease trap 10 into interior areas if the grease trap is installed in a building.

The inner tank 14 as best seen in FIG. 2, is roto-molded such that the inner tank 14 slides into place over the inlet invert 20 and the outlet invert 22 that lead into and out of the outer tank 12. As such, the inner tank 14 can be removed without disturbing the invert pipes leading in and out of the grease trap 10.

Figure 3:
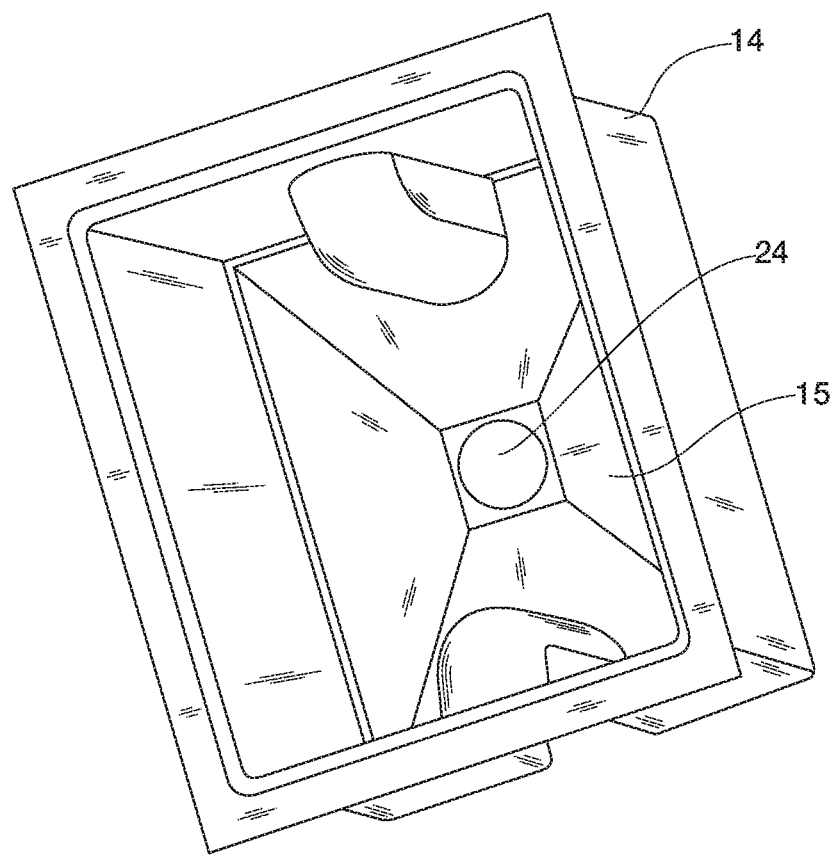
FIG. 3 is an interior view of one example of the inner tank of the grease trap of FIG. 2.

The walls of the inner tank 14 help support the bottom 15, as seen in FIGS. 3 and 4. The cylindrical shape for the tank is stronger than the rectangular shape, but the grease trap may also be square, rectangular, or other shapes.

In a preferred embodiment the exit port end of the inlet invert 20 needs to be as high as possible to maximize the storage space in the bottom 13. If the inlet invert 20 is not above the level of the solids layer, the solids layer may be disturbed as wastewater flows into the lower chamber 28 via the inlet invert 20.

As seen in FIGS. 2 and 4, a pipe 17 may be inserted to extend from the outlet 18 in the lid 16 through the upper chamber 26 of the inner tank 14, and extends through the hole 24 in the bottom 15 of the inner tank 14. Preferably, the pipe 17 has a smaller diameter than the hole 24 so that lightweight FOG may flow into the inner tank 14 through the space between the hole 24 and the pipe 17 inserted therein.

In operation, waste water enters the grease trap 10 via the inlet invert 20. The water flows into the diverging space between the bottom 15 and the bottom 13. Since the bottom 15 and the bottom 13 diverge from the edge of the tank to the center of the tank, as waste water flows into the diverging area, the velocity of the water flow slows, allowing the FOG to rise under the influence of gravity, since it is less dense than the water. Heavy solids settle on the bottom 13. Lightweight FOG gather at the bottom 15 and float through the central hole 24 into the inner tank 14 as seen in FIG. 4. Since the lightweight FOG accumulates at a location outside of the flow path for the effluent between the inlet invert and the outlet invert, less FOG is re-entrained in the effluent, so it does not pass back out of the grease trap via the outlet invert 22. The bottom 15 provides a barrier that sequesters the FOG that has become trapped above the bottom in the inner tank 14, protecting the FOG from the flow of grey water from the inlet 30 to the outlet 22. Thus the grey water current does not entrain the sequestered FOG and sweep it out of the grease trap via the outlet invert 22.

The heavy solids collected on the bottom 13 may be pumped out through the pipe 17. Continued pumping draws water from the tank 12, and pulls the FOG back down to the lower chamber and out through the pipe 17. The pipe 17 need not be strictly vertical, but could be slanted or have horizontal elements, as long as it leads from the lower chamber 28 to enable pumping of solids and FOG.

FIG. 1 shows one example of an improved grease trap 110. It includes an outer tank 112 and inner tank 119. The outer tank 112, in some examples, differs from the tank 12 in that it includes its own outer tubing to make the inlet invert 120, but a separate inlet invert construction can be used. In either case, the inlet invert is somewhat shorter than in the earlier shown grease trap of FIG. 1, having its opening into the grease trap between the walls 115 and 117 of the inner tank 114. Walls 115 and 117 substantially span the width of the inner volume of tank 114. The inner tank has an indentation to allow fit around an outlet invert 122. Constructions that incorporate the outlet invert as unitary with the inner tank are within the scope of the current disclosure.

The walls 115 and 117 diverge to make a volume of increasing cross section as effluent flows from the inlet invert 120 to the outlet invert 122, and each of the walls 115 and 117 is provided with a hole, preferably at its apex. The diverging volume allows the flow to move without hitting walls. The slope upper wall allows the grease to easily rise to the upper chamber, and the sloped lower wall allows solids to easily roll to the bottom of the tank. The walls can be conical, pyramidal, bowl shaped, slanted planes or other non-flat-and-level shapes. The holes are typically in the middle of the respective walls 115 and 117 but need not be.

The wall 117 is spaced above the bottom 113 of the outer tank, leaving a substantial volume between them in which solids can collect and still allow flow of grey water from the hole in wall 117 to the outlet invert 122. The wall 115 is lower than the bottom of the horizontal portion 123 of the outlet invert 122. The horizontal portion of the outlet invert typically is connected to a sewer line and defines the static water level in the tank 112. FOG collecting above the grey water in the tank 112 will rise slightly above the static water level because FOG has a specific gravity less than water, so the FOG can collect to a greater thickness than the water it displaces. The wall 115 is preferably at a height sufficient to allow a substantial amount of FOG to accumulate above the wall 115, so grease trap pumping need not be particularly frequent.

The bottom of wall 115 has a depending baffle 140 that aligns with the inlet 120. The baffle 140 diverts the incoming effluent circumferentially in the space between the walls 115 and 117 to slow the effluent, as the diverging walls 115 and 117 also slow the effluent. FOG in the slowed effluent rises toward the wall 115 and through its hole 224. FOG above the wall 115 is sequestered from the effluent traveling from the inlet 120 to the outlet 122, preventing re-entrainment of the FOG in the effluent. Solids and grey water descend through hole 124 in the wall 117 and are again slowed by the widening space below the wall 117 and a baffle 142 positioned to block direct flow to the outlet invert 122. Residual FOG in the effluent still has time to migrate back through the hole 124 and hole 224. Other residual FOG may find its way up the outside of the outlet invert and through the hole 323 to the space above wall 115, where it is protected from fast effluent flows.

The walls 115 and 117 may be joined by a peripheral sidewall that fits inside the peripheral sidewall of the tank 112, with additional molded configurations for the inlet invert 120, outlet invert 114 and baffles 140, 142. This provides the advantage that the combined parts can be made in one molding operation. Walls 115 and 117, peripheral sidewall, inlet invert 120, outlet invert 114 and baffles 140, 142 can all be made as one piece by rotomolding. Alternatively those parts can be assembled from separate pieces.

A lid like the lid 16 can be provided, having a hole that can be capped. The hole can be uncapped so the solids and FOG can be pumped out, as described above.

Figure 6:
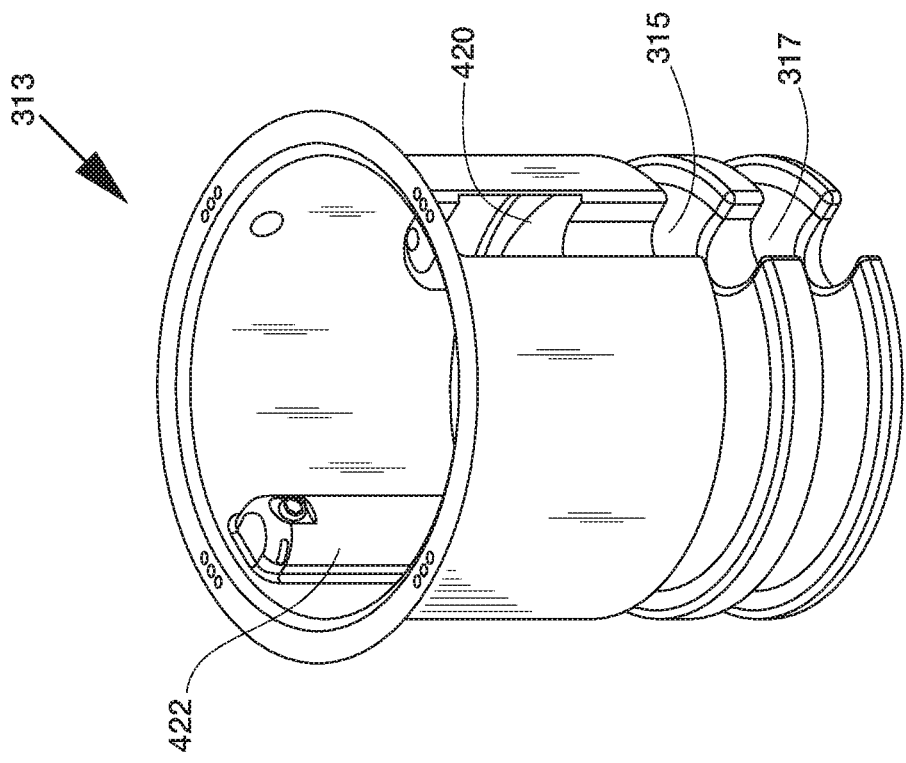
FIG. 6 shows one example of a top perspective view of the insert of FIG. 5.
Figure 5:
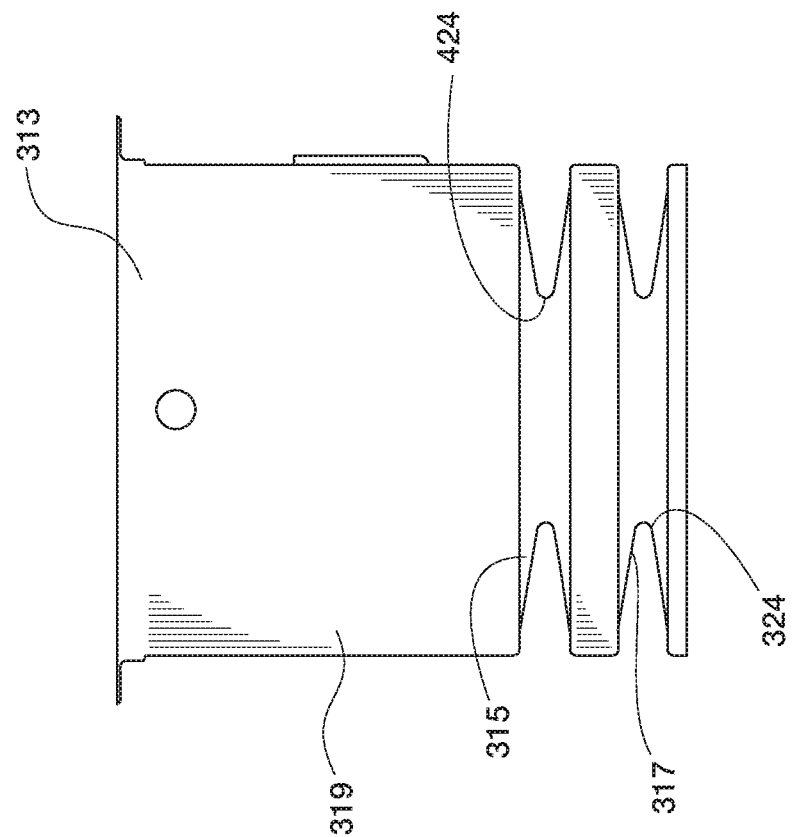
FIG. 5 shows a side view of another embodiment of an insert according to the inventions of the present disclosure.
Figure 7:
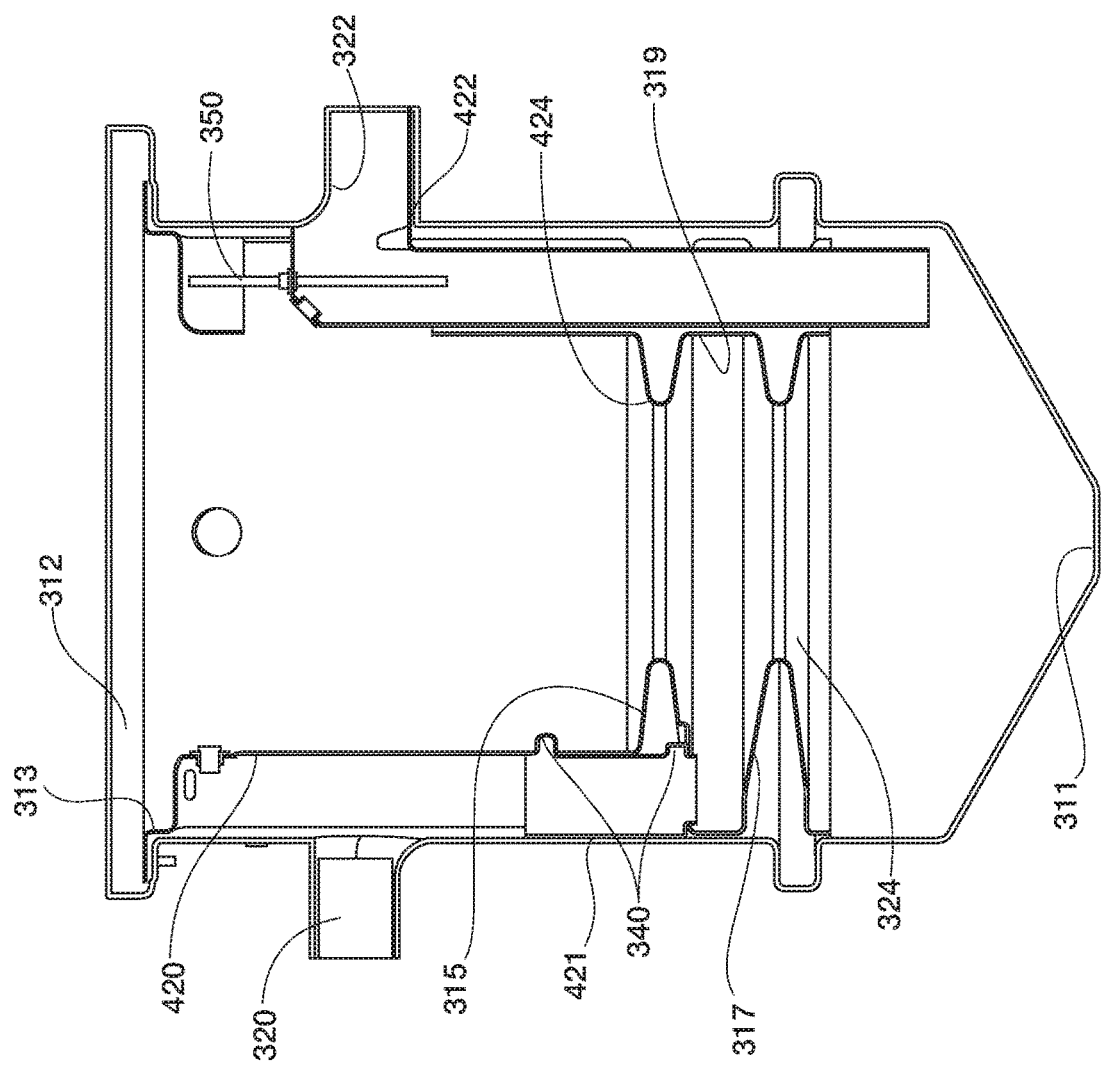
FIG. 7 shows one example of a sectional view through the middle of a grease trap including the middle of inlet and outlet inverts made using the insert of FIG. 5.
Figure 8:
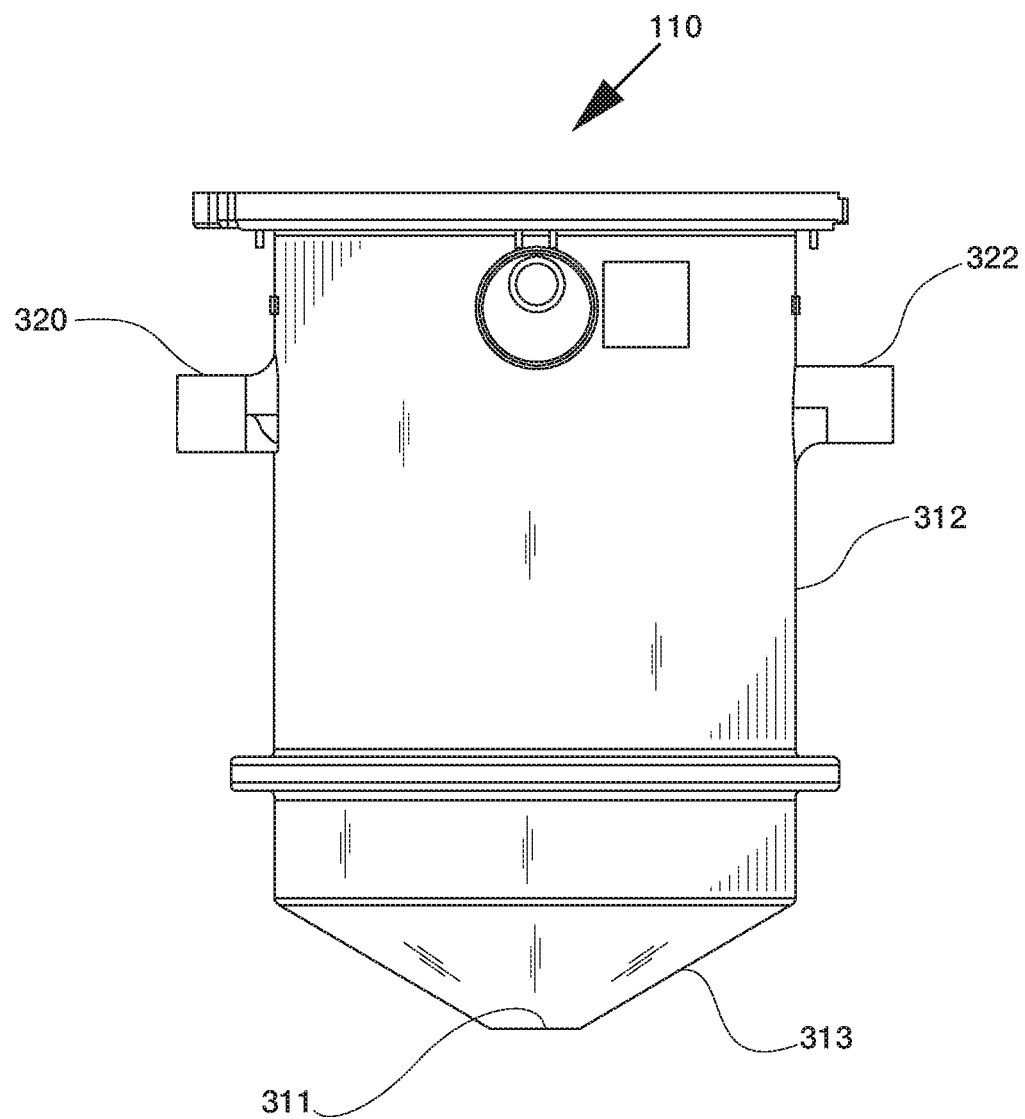
FIG. 8 is a side view of one example of a grease trap according to disclosures of the inventions.
Figure 9:
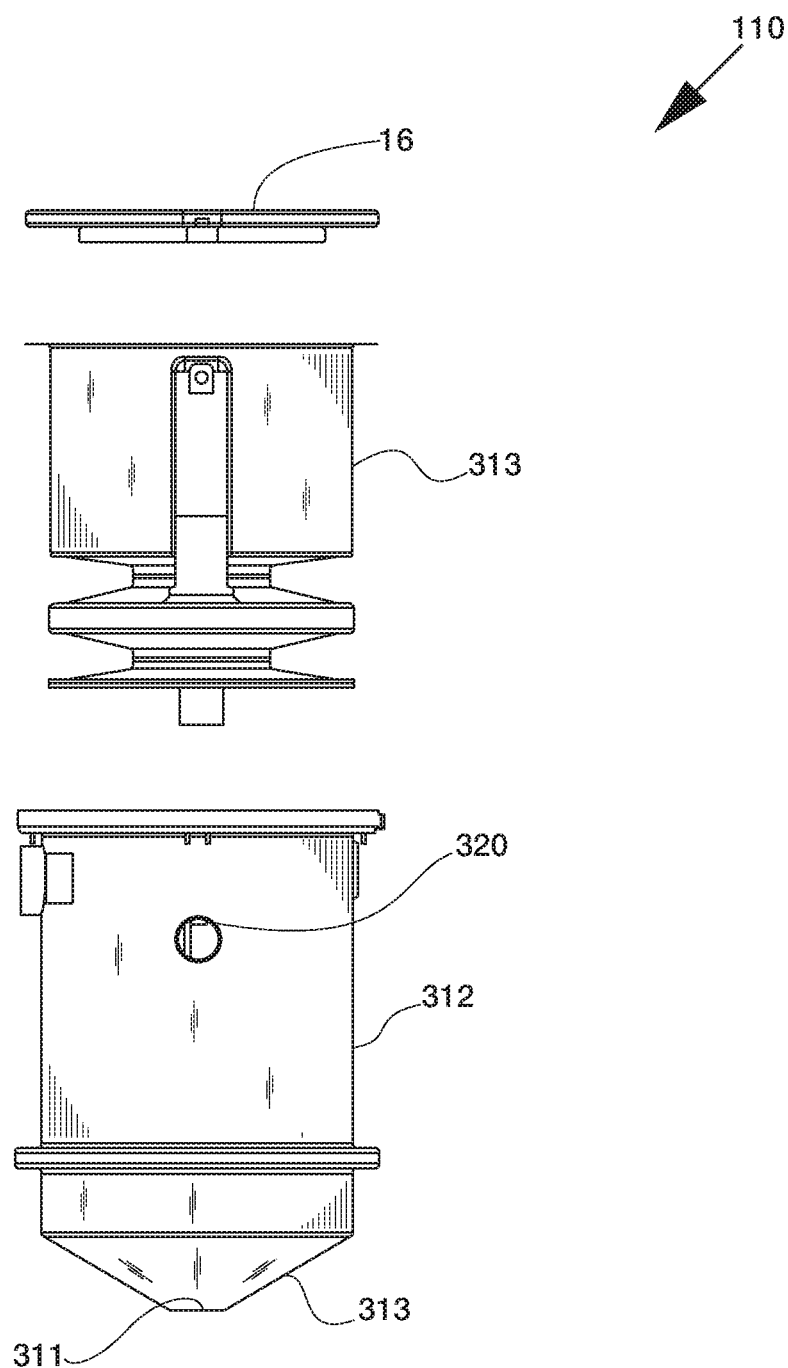
FIG. 9 is an exploded end view of one example of the grease trap according to FIG. 8.
Figure 10:
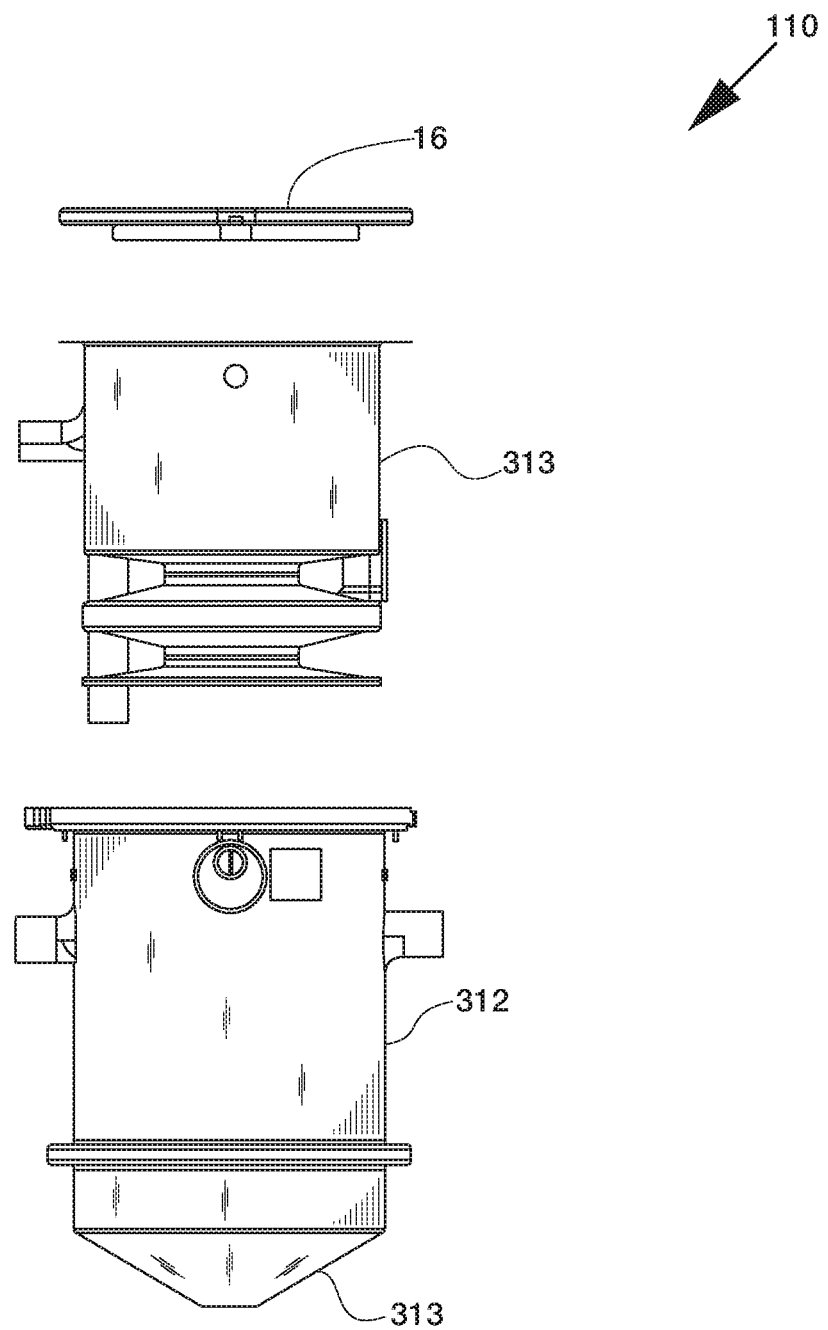
FIG. 10 is an exploded side view of one example of the grease trap according to FIG. 8.
Figure 11:
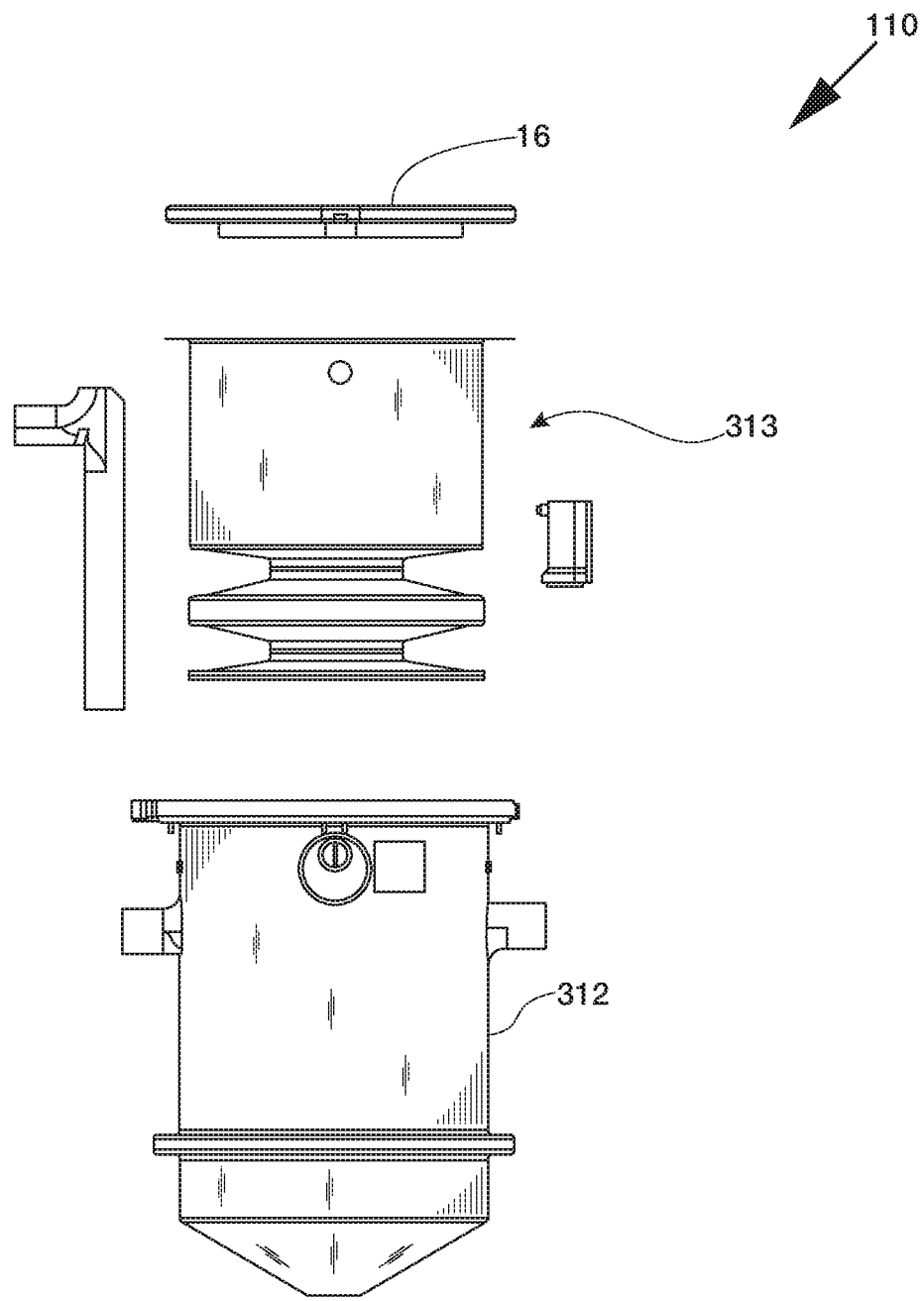
FIG. 11 is a further exploded view showing the inner tank of the grease trap according to FIG. 8.
Figure 12:
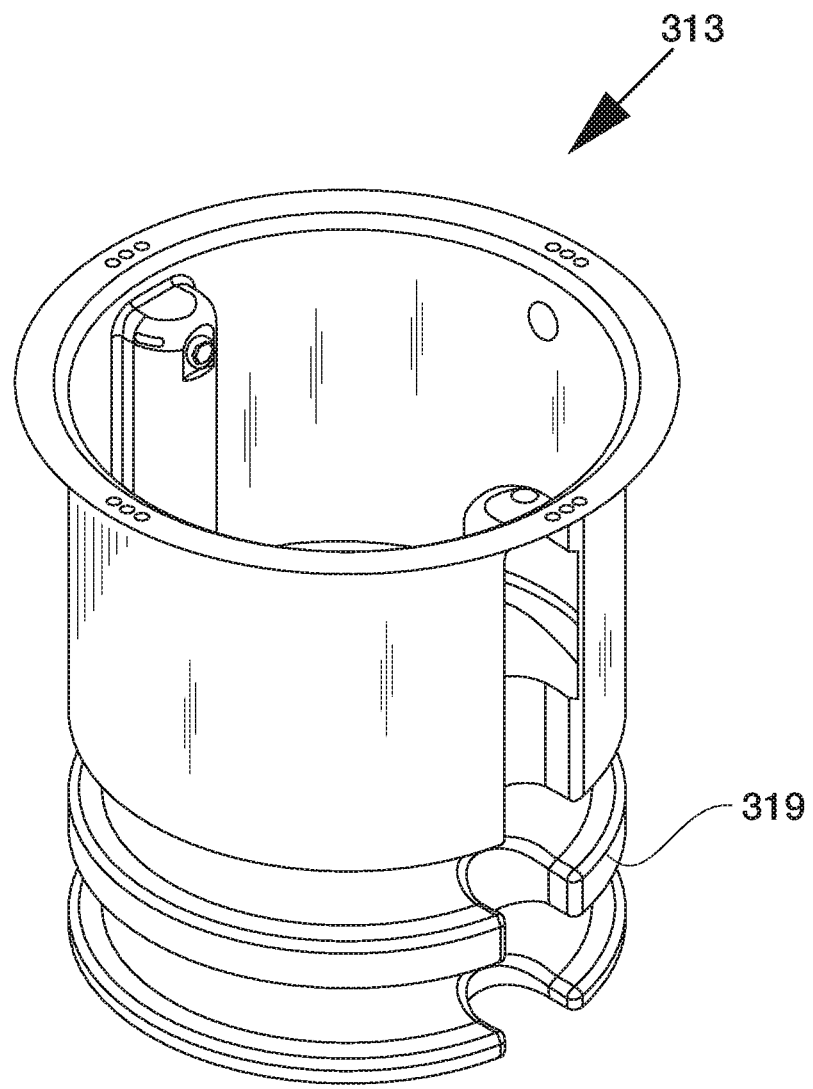
FIG. 12 is a top perspective view of one example of an inner tank according to FIG. 8.
Figure 13:
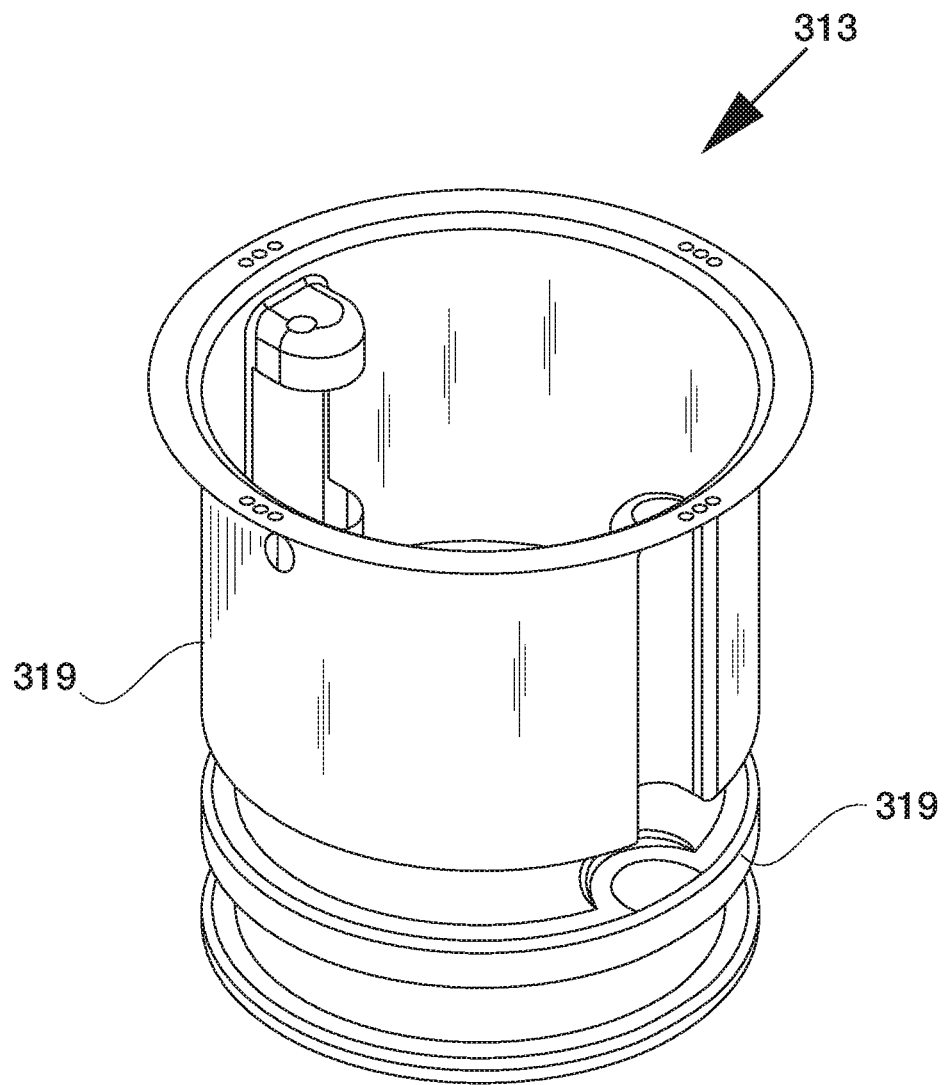
FIG. 13 is a front perspective view of the inner tank of FIG. 12 with parts removed.
Figure 14:
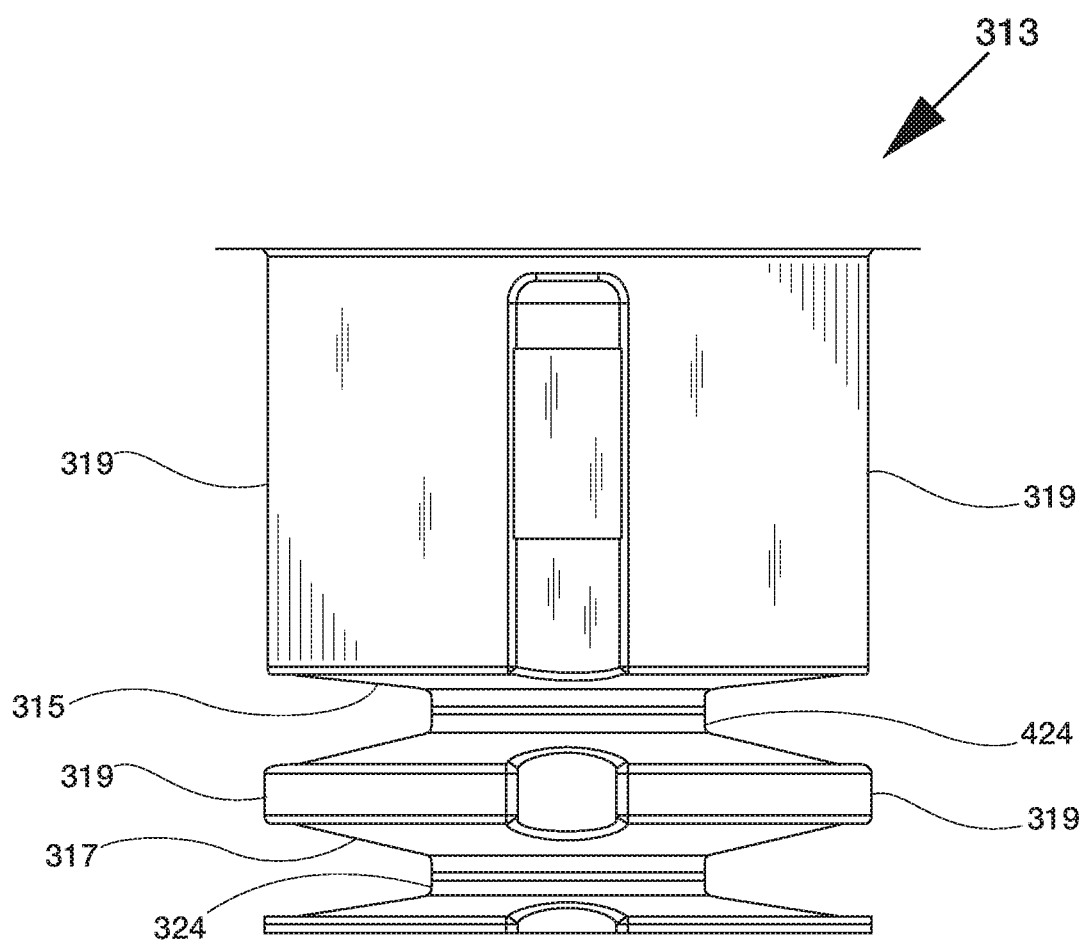
FIG. 14 is a side view of one example of an inner tank of the grease trap according to FIG. 8.
Figure 15:
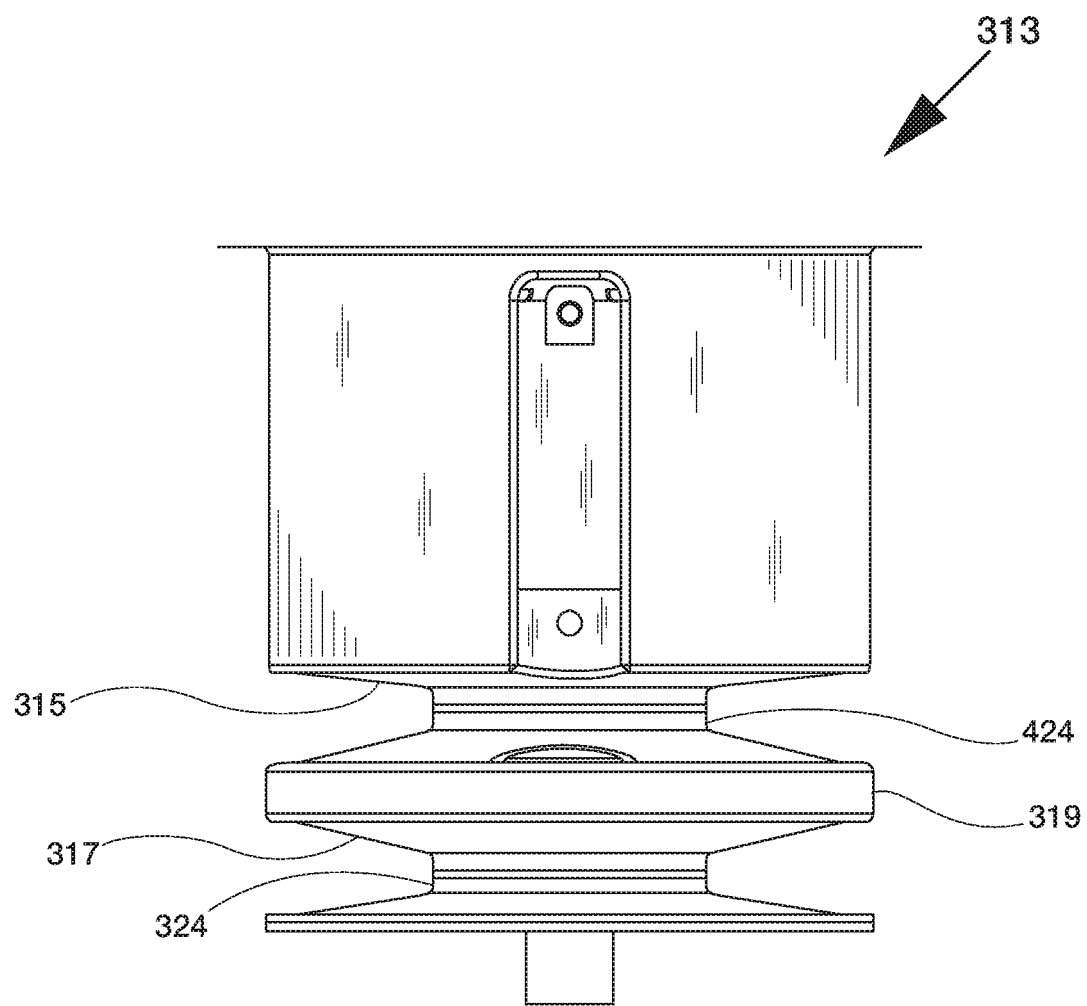
FIG. 15 is one example of an opposite side view of the inner tank of FIG. 14.
Figure 16:
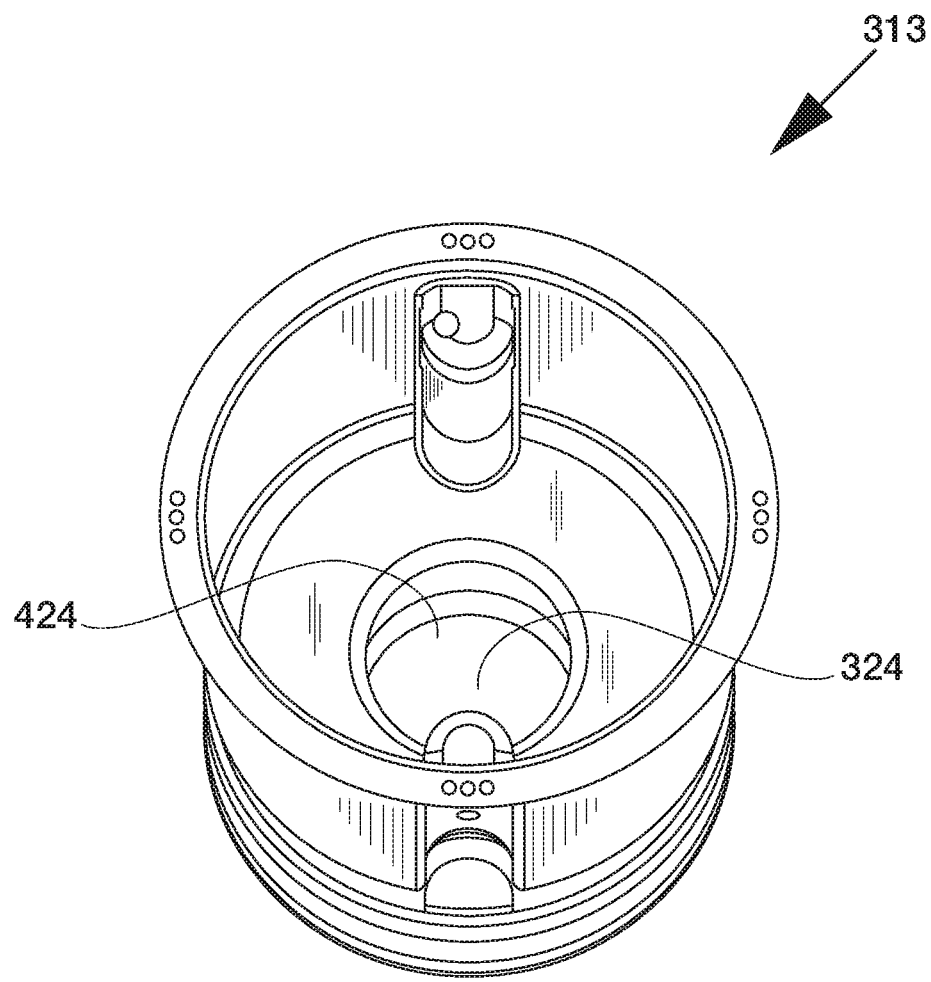
FIG. 16 is a top perspective view of one example of an inner tank according to FIG. 8.

An alternate embodiment is shown in FIGS. 5-6, with FIGS. 5 and 6 showing an insert component 313 for the assembled grease trap of FIG. 7. In FIGS. 5 and 6 the two walls 315 and 317 are molded as indentations in a peripheral wall 319, so that the indentations define holes 324 and 424. FIG. 6 show the location of a molding feature 420 to receive the inlet invert and a molding feature 422 to receive the outlet invert.

The grease trap shown in FIG. 7 has an outer tank 312, an insert 313 as shown in FIGS. 5 and 6 and a tube element 421 that helps to complete the inlet 320. The tube element 421 closes the back opening in the rotomolded insert component 313. Interlocking molded items 340 in the tube element 421 and the insert 313 hold the tube element in place, wedged against the outside wall of the tank 312. The trap includes a vent pipe 350 acts as an anti-siphon.

The grease trap can be equipped with additional elements such as a sensor for detecting FOG, water or solids levels in the tanks. Examples are shown in U.S. Pat. Nos. 8,252,188 and 7,828,960 to Batten et al., separate solids collectors as shown in U.S. Pat. No. 7,641,805 to Batten et al., increased capacity shapes as shown in U.S. Pat. No. 9,932,247 to Batten et al., monitoring of grease trap operation as shown in International Patent publication WO2017/035220 to Batten et al. The disclosures of these references are incorporated herein by reference.

In operation FOG may be separated from grey water in effluent. The effluent having FOG and grey water is discharged through the inlet 120, 320 into the tank 112, 312 between an upper wall or baffle 115, 315 and a lower wall or baffle 117, 317, allowing the grey water to descend in the tank through a hole 124, 324 in the lower wall 117, 317 and exit the tank along an upward path through the outlet 122, 322 to an exit 123 above the upper wall 115, 315. FOG floats through hole 224, 424 in the upper wall 115, 315 where the FOG is protected from entrainment in flows of grey water exiting the tank. Solids in the effluent traverse with the grey water as the grey water descends in the tank through the hole 124, 424 in the lower wall 117, 317, and collect there or are swept to the outlet 122, 322.

In the embodiment of FIG. 1, as the effluent enters the tank 112 (before the effluent encounters the upper and lower walls 115 and 117) it encounters baffling at 140 so the effluent progresses toward the lower wall 117 while leaving a path for FOG to float to the upper baffle 115. As the grey water moves to exit the tank it encounters baffling at 142 to lengthen the path the grey water traverses to exit the tank.

The second baffle or wall between the sequestered FOG and the exiting grey water further enhances the operation, leading to near-complete removal of FOG from the effluent. Standard ASME A112.14.13 Grease Interceptor Rating Tests show 99% removal of FOG (99% cumulative and 97% incremental) for nearly 9 times longer than conventional units (and in some examples, 9 times improvement as evaluated by drop number).

Certain modifications and improvements will occur to those skilled in the art upon reading the foregoing description. It should be understood that all such modifications and improvements have been omitted for the sake of conciseness and readability, but are properly within the scope of the following

What is claimed is:

1. A grease trap for separating waste from waste water that includes grey water and FOG (fats, oils, grease) comprising
a tank having a bottom and an interior volume;
an inlet invert in the tank having a discharge end for discharging waste water into the tank;
an outlet invert in the tank having a drain end for removing grey water from the tank;
a first baffle across the interior volume below the discharge end of the inlet invert and above the drain end of the outlet invert having a hole allowing grey water to descend through the hole to a path under the first baffle to the drain end of the outlet invert; and
a second baffle across the interior volume above the discharge end of the inlet invert, the second baffle having an upper surface and a hole allowing FOG to float through the hole in the second baffle to collect in the interior volume above the upper surface of the second baffle.

2. The grease trap according to claim 1 wherein the tank is roto-molded plastic.

3. The grease trap according to claim 1 further comprising a lid covering the tank.

4. The grease trap according to claim 1 wherein the first and second baffles diverge so waste water entering the tank between the baffles encounters an enlarging volume.

5. The grease trap according to claim 1 wherein the first baffle is conical with a downward apex and the second baffle is conical with an upward apex.

6. The grease trap according to claim 1 wherein the first baffle is conical and the hole in the first baffle is at a downward apex and the second baffle is conical and the hole in the second baffle is at an upward apex.

7. The grease trap according to claim 1 wherein the first and second baffles each substantially span the width of the interior volume of the tank.

8. The grease trap according to claim 1 wherein the baffles are connected to one another by a joining peripheral wall sized and shaped to nest in the tank.

9. The grease trap according to claim 8 wherein the peripheral wall has an indentation for the inlet invert and an indentation for the outlet invert.

10. The grease trap according to claim 1 wherein the first baffle includes a vertical baffle extending downward and positioned to shield the drain end of the outlet invert.

11. The grease trap according to claim 1 wherein the second baffle includes a vertical baffle extending downward and positioned to shield the discharge end of the inlet invert.

12. A grease trap for separating waste from waste water that includes grey water and FOG (fats, oils, grease) comprising
a tank having a bottom and an interior volume;
an inlet invert in the tank having a discharge end for discharging waste water into the tank;
an outlet invert in the tank having a drain end for removing grey water from the tank;
a first baffle substantially spanning the interior volume of the tank below the discharge end of the inlet invert and above the drain end of the outlet invert, the first baffle having a hole allowing grey water to descend through the hole to a path under the first baffle to the drain end of the outlet invert;
a second baffle substantially spanning the interior volume of the tank above the discharge end of the inlet invert and above the drain end of the outlet invert, the second baffle having an upper surface and a hole allowing FOG to float through the hole in the second baffle to collect in the interior volume above the upper surface of the second baffle;
wherein the first baffle is conical and the hole in the first baffle is at a downward apex, the second baffle is conical and the hole in the second baffle is at an upward apex, the baffles are connected to one another by a joining peripheral wall sized and shaped to nest in the tank, the peripheral wall has an indentation for the inlet invert and an indentation for the outlet invert, and the first and second baffles diverge so waste water entering the tank between the baffles encounters an enlarging volume.

13. A grease trap for separating waste from waste water comprising
an outer tank having a bottom;
an inlet invert having a discharge end for directing waste water into the outer tank;
an outlet invert for directing water from the outer tank;
an inner pair of horizontal baffles each having a hole, one baffle being above the discharge end and the other baffle being below the discharge end, so the baffles divide the outer tank into upper, middle and lower chambers the baffle that is above the discharge end having an upper surface; and
whereby FOG (fats, oils, grease) and solids may separate from the waste water within the middle chamber such that grey water and heavy solids fall through the hole in a lower one of the baffles to the lower chamber and FOG rises to enter the upper chamber through the hole in the upper one of the baffles to collect in the upper chamber in an interior volume above the upper surface and is sequestered by both baffles from currents flowing to the outlet invert, thereby inhibiting later mixing of sequestered FOG into the grey water exiting the grease trap.

14. A method of separating FOG (fats, oils, grease) from grey water comprising
discharging effluent having FOG and grey water into a tank between an upper baffle and a lower baffle, the upper baffle across an interior volume of the tank,
allowing the grey water to descend in the tank through a hole in the lower baffle and exit the tank along an upward path to an exit above the upper baffle,
allowing the FOG to float through a hole in the upper baffle to collect in the interior volume above an upper surface of the upper baffle, where the FOG is protected from entrainment in flows of grey water exiting the tank.

15. The method as claimed in claim 14 wherein discharging effluent having FOG and grey water into a tank between the upper baffle and the lower baffle includes baffling a path of the effluent as it enters the tank before the effluent encounters the upper and lower baffles so the effluent progresses toward the lower baffle while leaving a path for FOG to float to the upper baffle.

16. The method as claimed in claim 14 wherein allowing the grey water to exit the tank includes baffling a path of the grey water after it descends through the hole in the lower baffle to lengthen the path the grey water traverses to exit the tank.

17. A The method as claimed in claim 14 wherein discharging effluent having the FOG and the grey water into a tank includes discharging solids in the effluent so the solids traverse with the grey water as the grey water descends in the tank through the hole in the lower baffle.

* * * * *